US009625067B2

(12) United States Patent (10) Patent No.: US 9,625,067 B2
Fitzpatrick (45) Date of Patent: Apr. 18, 2017

(54) CLAMP SUITABLE FOR INCREASING THE FATIGUE LIFE OF THE BUTT WELDS OF A PIPE PRESSURE VESSEL WHICH IS SUBSEQUENTLY BENT

(75) Inventor: Patrick John Fitzpatrick, Calgary (CA)

(73) Assignee: Sea NG Corporation, Calgary, Alberta (CA)

( * ) Notice: Subject to any disclaimer, the term of this patent is extended or adjusted under 35 U.S.C. 154(b) by 463 days.

(21) Appl. No.: 13/369,107

(22) Filed: Feb. 8, 2012

(65) Prior Publication Data

US 2012/0138153 A1 Jun. 7, 2012

Related U.S. Application Data

(63) Continuation-in-part of application No. 12/855,970, filed on Aug. 13, 2010, now abandoned.

(60) Provisional application No. 61/238,852, filed on Sep. 1, 2009.

(51) Int. Cl.
*F16L 13/00* (2006.01)
*F16L 13/02* (2006.01)

(52) U.S. Cl.
CPC ..... *F16L 13/0236* (2013.01); *Y10T 29/49998* (2015.01); *Y10T 137/0318* (2015.04); *Y10T 137/8593* (2015.04)

(58) Field of Classification Search
CPC ........ F16L 13/04; F16L 13/06; F16L 13/0236
USPC ... 285/288.5, 288.6, 288.8, 288.9, 420, 367, 285/419, 417, 373, 369, 15
See application file for complete search history.

(56) References Cited

U.S. PATENT DOCUMENTS

| 1,345,543 A | 7/1920 | Huth |
|---|---|---|
| 1,908,421 A | 5/1933 | Heggem |
| 1,967,466 A | 7/1934 | Damsel |
| 2,868,230 A | 1/1959 | Stokes |

(Continued)

FOREIGN PATENT DOCUMENTS

| CA | 1314598 | 3/1993 |
|---|---|---|
| CA | 2230271 | 1/1998 |

(Continued)

OTHER PUBLICATIONS

Canadian Intellectual Property Office, "Internationa Search Report for PCT Application No. PCT/CA2011/000216", Jun. 27, 2011.

(Continued)

*Primary Examiner* — David E Sosnowski
*Assistant Examiner* — James Linford
(74) *Attorney, Agent, or Firm* — Gable Gotwals

(57) ABSTRACT

A pipe clamp for affixing to a pipe subjected to bending. The pipe clamp includes an inside clamp segment and an outside clamp segment each having a semi-cylindrical shape, a first end and a second end. An inside surface of the inside clamp segment is substantially smooth for permitting slippage of an outside surface of the pipe with respect to the inside surface of the clamp segment. The outside clamp segment has an inside surface that defines a friction element. The friction element is for gripping an outside surface of the pipe to which the outside clamp segment is affixed. A clamp mechanism is provided for securing the inside clamp segment to the outside clamp segment.

18 Claims, 8 Drawing Sheets

(56) References Cited

U.S. PATENT DOCUMENTS

| | | | |
|---|---|---|---|
| 3,596,931 A * | 8/1971 | Mishler | F16L 15/003 |
| | | | 285/332.2 |
| 4,198,081 A * | 4/1980 | Harrison et al. | 285/381.2 |
| 4,236,736 A | 12/1980 | Anderson | |
| 4,381,020 A | 4/1983 | Daghe et al. | |
| 4,409,708 A | 10/1983 | Hauffe | |
| 4,493,139 A | 1/1985 | McClure | |
| 4,709,729 A | 12/1987 | Harrison | |
| 4,889,167 A | 12/1989 | Morris | |
| 4,898,407 A | 2/1990 | Zeidler | |
| 5,118,139 A | 6/1992 | Lott | |
| 5,190,324 A | 3/1993 | Bird et al. | |
| 5,209,524 A | 5/1993 | Corwon et al. | |
| 5,358,283 A | 10/1994 | Silva | |
| 5,468,025 A * | 11/1995 | Adinolfe et al. | 285/114 |
| 5,605,357 A | 2/1997 | Bird | |
| 5,738,386 A | 4/1998 | Barefoot et al. | |
| 5,772,253 A | 6/1998 | Hodge et al. | |
| 5,950,683 A | 9/1999 | Henderson et al. | |
| 5,992,801 A | 11/1999 | Torres | |
| 6,000,104 A | 12/1999 | Mann | |
| 6,302,450 B1 | 10/2001 | Dole et al. | |
| 6,305,719 B1 | 10/2001 | Smith, Jr. et al. | |
| 6,364,367 B1 | 4/2002 | Hintzen | |
| 6,398,270 B1 * | 6/2002 | Fukui et al. | 285/373 |
| 6,517,122 B1 | 2/2003 | Minemyer | |
| 7,076,982 B2 | 7/2006 | Coop | |
| 7,231,984 B2 | 6/2007 | Jaensch | |
| 7,232,160 B2 | 6/2007 | Krausz et al. | |
| 7,341,287 B2 * | 3/2008 | Gibb | F16L 17/04 |
| | | | 285/367 |
| 7,384,076 B2 | 6/2008 | Bradley | |
| 8,316,683 B2 | 11/2012 | Tomizawa et al. | |
| 2004/0216656 A1 | 11/2004 | Fitzpatrick et al. | |
| 2006/0267343 A1 | 11/2006 | Wright | |

FOREIGN PATENT DOCUMENTS

| | | |
|---|---|---|
| CN | 101678425 A | 3/2010 |
| DE | 581719 | 7/1933 |
| EP | 0607430 | 6/1991 |
| GB | 297650 | 9/1928 |
| GB | 441522 | 1/1936 |
| GB | 734341 | 7/1955 |
| GB | 2216734 A | 10/1989 |
| JP | 579040 | 2/1982 |
| JP | 636197 | 1/1988 |
| JP | 6088401 | 3/1994 |
| JP | 10-132169 | 5/1998 |
| NL | 1002198 C2 | 1/1996 |
| NL | 1022198 | 12/2002 |
| WO | WO 94/00711 A1 | 1/1994 |
| WO | WO 95/27101 A1 | 10/1995 |
| WO | WO 98/00250 | 1/1998 |

OTHER PUBLICATIONS

European Patent Office, "Extended European Search Report for EP Appl. No. 11815940.9", Oct. 17, 2014.
Office Action Issued in Japanese Patent Application No. 2015-028416 on Nov. 6, 2015 (Includes partial English translation).

* cited by examiner

CLAMP SUITABLE FOR INCREASING THE FATIGUE LIFE OF THE BUTT WELDS OF A PIPE PRESSURE VESSEL WHICH IS SUBSEQUENTLY BENT

CROSS REFERENCE TO RELATED APPLICATIONS

This application is a Continuation-in-Part of U.S. Utility patent application Ser. No. 12/855,970, entitled "CLAMP SUITABLE FOR INCREASING THE FATIGUE LIFE OF THE BUTT WELDS OF A PIPE PRESSURE VESSEL WHICH IS SUBSEQUENTLY BENT," filed Aug. 13, 2010, which claims the priority of U.S. Provisional Patent Application No. 61/238,852 entitled "CLAMP SUITABLE FOR INCREASING THE FATIGUE LIFE OF THE BUTT WELDS OF A PIPE PRESSURE VESSEL WHICH IS SUBSEQUENTLY BENT," filed Sep. 1, 2009, the contents of both of which are hereby incorporated by reference.

FIELD OF THE INVENTION

The invention relates to method of minimizing bending strain for pipe welds and for a pipe clamp to facilitate the same. More particularly, the invention relates to a pipe clamp for locating over a butt weld in a length of pipe to be subjected to bending forces to protect against excessive strain in the weld area.

BACKGROUND OF THE INVENTION

The invention relates to the storage of natural gas (CNG) or other fluids or gases under pressure in pressure vessels comprised of very long lengths (generally over 1 km and under 30 km) of pipe, e.g., steel pipe. For practical management, these lengths of pipe are coiled on a steel spool by a simple winding process. The result is termed a "Coselle®". Many Coselles® may be installed in the hold of a ship. A Coselle® carrying ship loads gas in a first port and discharges in a second port. A Coselle® carrying ship may make ~60 cycles per year. The pressurizing and de-pressurizing associated with the loading and unloading of gas induces major stress changes in the steel of the Coselles®, which could possibly result in fatigue cracking. The long lengths of pipe are necessarily constructed by welding shorter lengths of pipe together. The welds and pipe material adjacent the welds are more sensitive to fatigue problems than the parent metal of the pipe.

It has become apparent during prototype Coselle® testing where 6" pipe was wound about a hub of ~9 meters diameter, that higher than average strains are experienced in the outside wall of the pipe at the heat affected zone (HAZ) interface of the circumferential joining welds, i.e., butt welds, contained in the pipe. The highly localized strains, (approximately 6% as opposed to approximately 1.8% average) shorten the fatigue life of the weld and are responsible for limiting the ultimate fatigue life of the Coselle®. As a result, it was necessary to operate at a lower working pressure than would be allowed if the fatigue life were extended, which reduced the gas volume and raised the overall cost of gas transport.

In addition to exceptional strain, the weld properties may also be adversely affected by ovallization of the pipe during the bending process. At the four points of high and low curvature of the oval, stress is increased during the pressurization process and this will reduce fatigue life, particularly for the butt welds.

SUMMARY OF THE INVENTION

It is economically important to ensure a long fatigue life for the butt welds in the Coselle® pipe pressure vessel by protecting against both excessive strain of the heat affected zone and ovallization, which are both induced by the coiling process. This is achieved by the clamp apparatus of the invention.

The solution chosen to the excessive strain problem is to severely limit the bending of the pipe and to prevent ovalling in the region of butt welds and simultaneously to largely prevent strain in the outside of the pipe. This may be accomplished by applying a bend restraining member, such as a clamp, to a pipe over a butt weld. The following describes the clamp that was developed and tested successfully. However, other embodiments of bend restraining members or clamps could be derived to accomplish the desired results.

An important concern when bending the pipe in the vicinity of a butt weld is the straining of the heat affected zone adjacent to the weld, e.g. in the heat affected zone on the outside or "stretched" portion of bent pipe. The clamp of the invention does two things. First, the clamp largely eliminates bending of the pipe. Second, the clamp also prevents the upper half of the pipe from being strained. In one embodiment, the latter is accomplished by means of scoring on the inside of the clamp. The narrow ridges of the scoring, when compressed onto the pipe by the tightening of bolts, produce a high friction force that prevents the outside of the pipe from moving significantly and so nearly eliminates the strain of the weld region.

An example clamp has a length of 300 mm. Preferably, the clamp has a length of 1.75 external diameters of pipe, but larger or smaller clamps could also be used. The clamp functions as a reinforcing brace comprised of two semi-circular, straight half-cylinders of steel bolted together on both sides of the pipe. The clamp is made up of a first half-cylinder located on the outside of the bend of the pipe, and is made up of a second half-cylinder located on the inside of a bend of the pipe. The inside radius of curvature of both clamp half-cylinders is preferably equal to the outside radius of the pipe. The thickness of the clamp is such that the clamp is not plastically bent by the bending forces.

The rigidity of the clamp limits bending of the pipe in the region of the weld and, with its special features described below, ensures that the localized axial strains in the outside wall of the pipe remain low during and after winding. Simultaneously, the clamp ensures that ovalization is minimized.

In the preferred embodiment, the outer half of the clamp contains scoring on its inside to ensure bonding with the outside surface of the pipe. The primary mechanism by which the clamp works to limit strain in the outside of the pipe is inter-particle static friction on the surface of the pipe, and this is the reason for providing scoring. Scoring (which preferably resembles threading) has a pitch such that the ridges will bite slightly into the pipe and an overall contact area so as not to damage the pipe by compression during the bending process. For purposes of this application, when Applicant refers to "threads" or "threading", what is meant is "having the characteristics of a helical ridge of a screw or bolt". The inside half of the clamp is not scored and in fact, slippage on the inside of the pipe is not undesirable.

As discussed in the background, localized strains are induced by coiling a 6" pipe on a hub of approximately 9 m in diameter. The localized strains without the use of a clamp were found to be approximately 6% in the area of the weld and 1.8% average for the pipe. With the use of the clamp of the invention, the localized strains were found to be approximately 0.5%.

In the vicinity of the pipe weld, the pipe is almost completely surrounded by the rigid clamp. Therefore, ovallization of the pipe is almost completely prevented. However, the presence of the clamp can induce serious ovalling, even kinking, of the pipe at both ends of the clamp as the pipe is wound around a spool. To address this problem, two shape modifications to the inner half of the clamp are made. First, the two ends of the inside half of the clamp are ground away in a specific pattern to ease the concentration of force on the pipe at the ends of the clamp. The preferred shape of the metal removed, i.e. of the voids, is a semicircle of radius equal to the radius of the pipe, but approximations to this semi-circular shape may be used. Secondly, ovallization in the vicinity of the clamp may be further reduced by grinding away some of the thickness of the inside half of the clamp so that it is significantly thinner at its outside edges than at its center (roughly half the thickness is preferred). The reason is to further minimize the transverse force on the pipe when the clamp first hits the underlying pipes beyond the relief provided by the removed semicircles.

While both halves of the clamp have their radii of curvature identical to the outside of the pipe, the two halves of the clamp do not comprise a complete 360° turn. When bolts are fully tightened, the two halves of the clamp preferably do not touch each other so that the full force of the clamp halves is impressed on the pipe.

When the bending of the pipe is complete, the clamp is removed as follows: the inward force of the pipe is reduced by a very slight reverse turn of the spooling hub. The clamp is then disassembled. The outside half of the clamp is removed and then the inside half of the clamp is rotated around the pipe and lifted off. To facilitate the rotation, the bottom half of the clamp preferably has a reasonably uniform or reduced thickness profile in the rotary sense.

In use, the clamp halves are very strongly tightened on the pipe by a series of bolts. The scoring and the tightening threads in the bolt holes wear down with use so that the clamp will have to be replaced after a number of uses.

Both halves of the clamp have a small channel of metal removed from the inside centers of the halves in the hoop direction to accommodate the weld bead of the butt weld. This obviates the need to grind the weld.

The clamp is preferably made of steel with a Young's Modulus closely equal to that of the steel of the pipe. The yield stress of the steel used in the clamp is preferably at least that of the pipe and up to 40% greater.

A first embodiment of the invention is rigid and heavy (about 200 lbs weight). This embodiment totally protects the weld and even with 1,000,000 cycles no fatigue damage was found to have occurred to the weld. The first embodiment is, however, cumbersome to manipulate. A second embodiment is a lighter version (about 40 lbs).

The clamp described above in detail is a preferred embodiment of a device to minimize the strain in the outer edge of a pipe and to minimize ovalling in the region of a butt weld while being bent around a coil (FIG. 13). Other embodiments may also be used.

For example, the clamping force may be provided not by bolts, but by external hydraulic pressure. The halves of the clamp may be held together by welding or binding with wire. Alternatively the clamp halves may be significantly heated before being applied and welded. The clamping force would be due to metallic contraction as the clamp cools. Alternatively, the two clamp halves could be drawn together by a buckling mechanism, with or without the assistance of a hydraulic press.

Alternative means of creating friction may be developed to eliminate the need for the threading, such as metal to metal adhesives, low temperature metal alloy solders, and a layer of sharp particles of a substance harder than steel, such as silicon carbide, etc. Additionally, strips of steel, centered on the butt weld may be welded axially on the pipe. The butt weld and adjacent areas may be wound with a strong material that is bonded to the pipe. The material may be steel wire, e-glass, Kevlar® or other material that could be permanently bonded to the pipe, which would reduce the induced winding strains and/or reduce ovallization.

In a further embodiment, a section of pipe whose ID is the same as the OD of the main pipe may be slipped onto the main pipe before the welding operation. The section of pipe may then be centered over the butt weld. This pipe section resembles the clamp but may remain in place after the main pipe is bent.

Alternatively, a small pipe section or other steel structure may be inserted inside the main pipe and restrained so as to be centered on the butt weld. The small section of pipe remains in place after welding and bending.

DETAILED DESCRIPTION OF THE PREFERRED EMBODIMENTS

Figure 1:
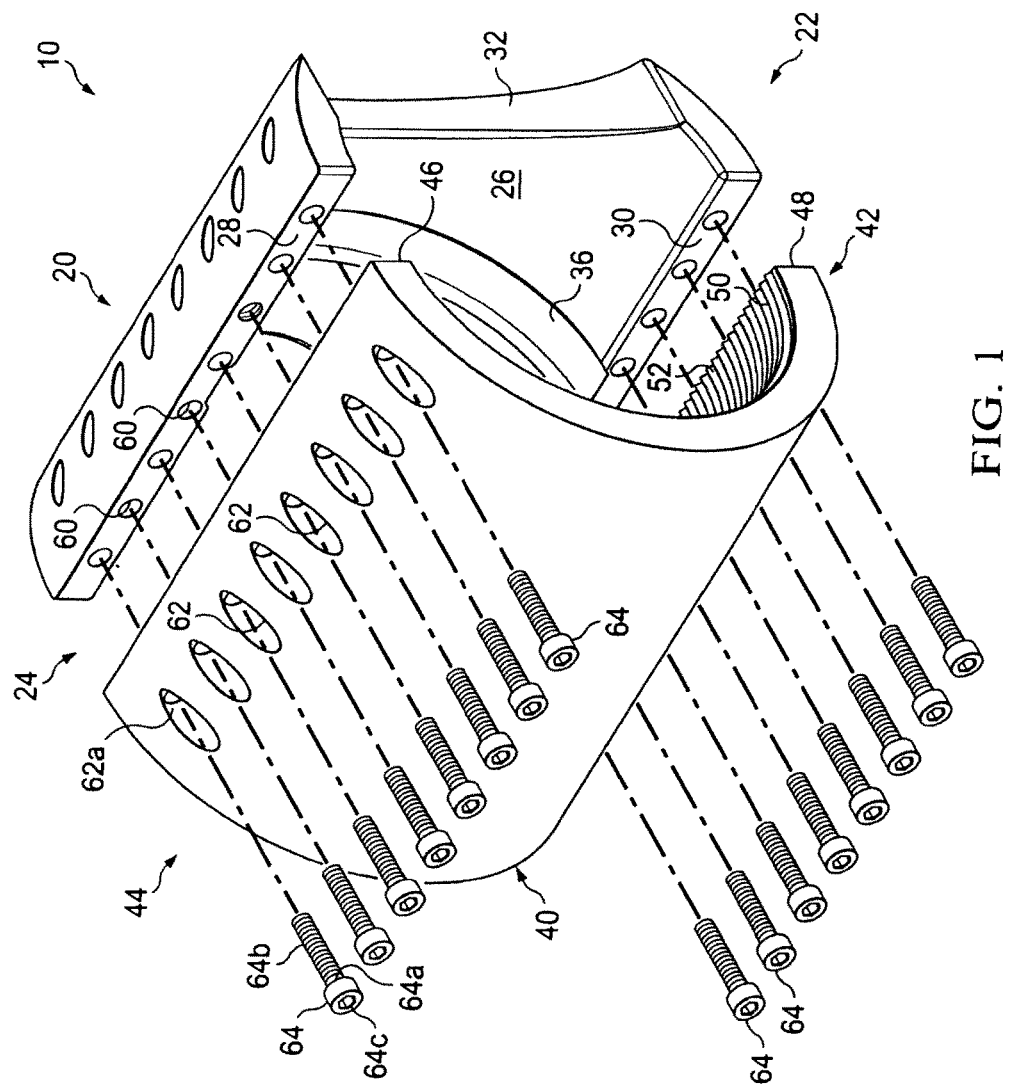
FIG. 1 is an exploded perspective view of the pipe weld clamp of the invention including an inside clamp segment and an outside clamp segment.
Figure 2:
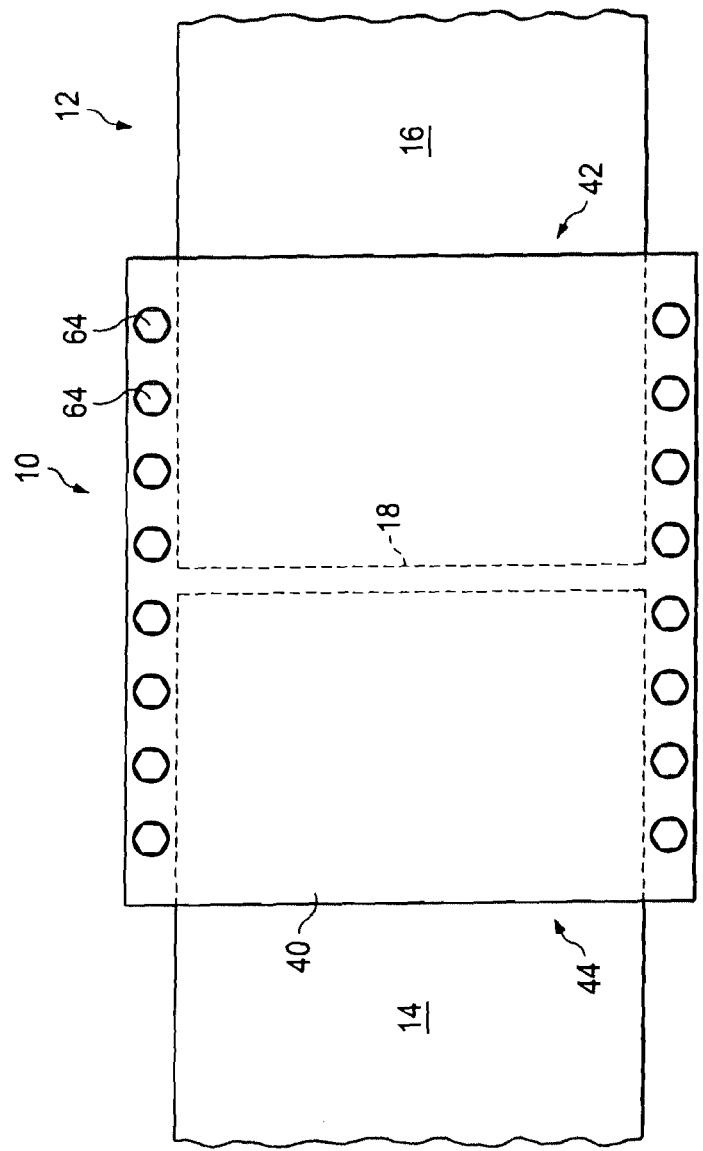
FIG. 2 is a partial cross-sectional view of the pipe weld clamp of FIG. 1 shown installed within a pipe.
Figure 13:
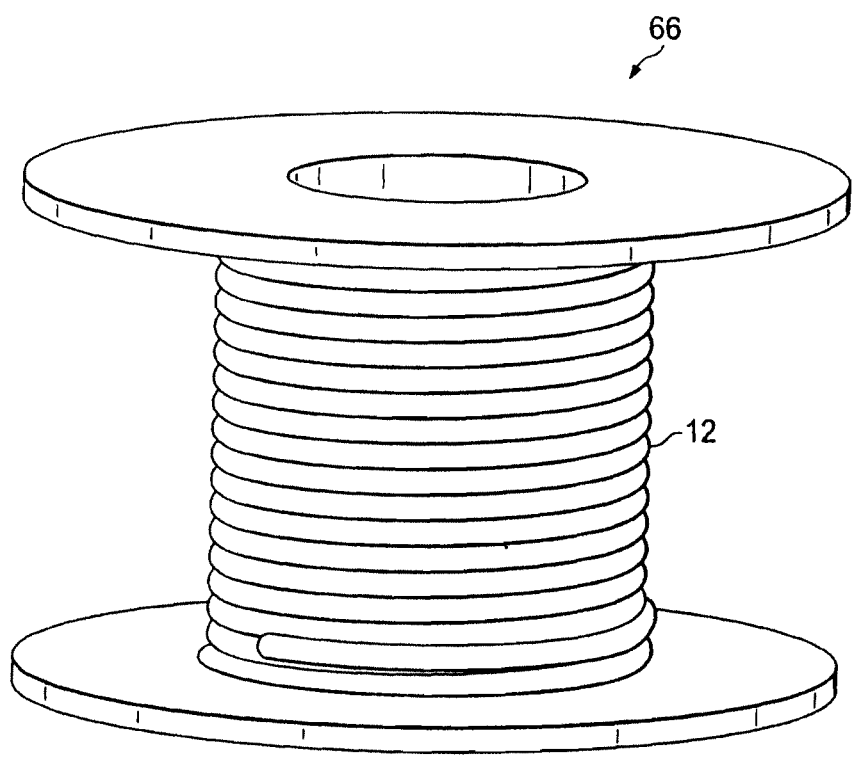
FIG. 13 is a perspective view of the pipe of FIG. 2 wound on a core.

Referring now to FIGS. 1 and 2, shown is pipe clamp designated generally 10. Pipe clamp 10 is for affixing to pipe 12 (FIGS. 2, 13). Pipe 12 consists of a plurality of pipe segments joined together end to end via butt welds, e.g., first pipe segment 14 and second pipe segment 16 are joined together via butt weld 18. Pipe clamp 10 is provided to protect butt weld 18 and its heat affected zones from excessive strain and ovallization, both induced by a coiling process of pipe 12 to form a Coselle®, e.g., as shown in FIG. 13.

Figure 3:
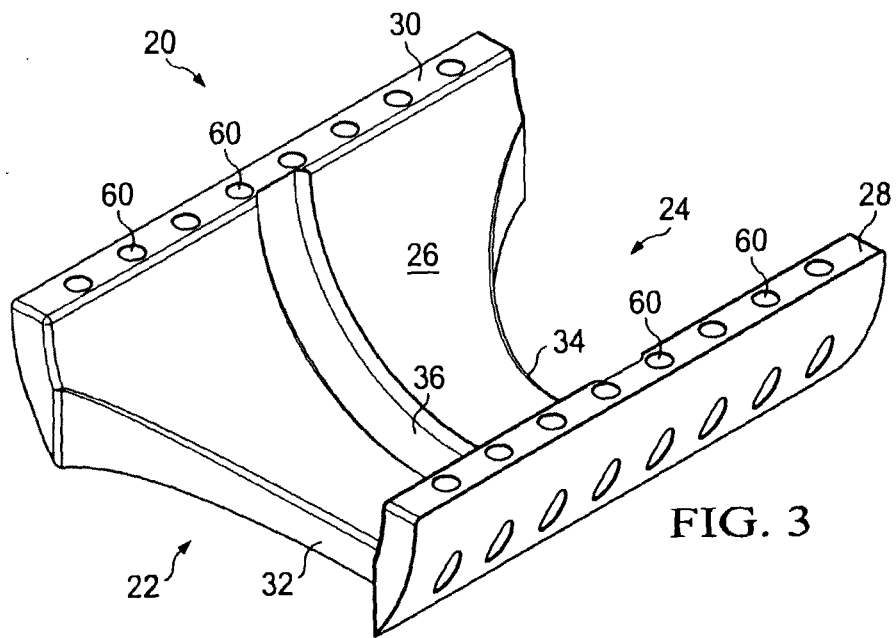
FIG. 3 is a perspective view of the inside pipe clamp segment of FIG. 1.
Figure 4:
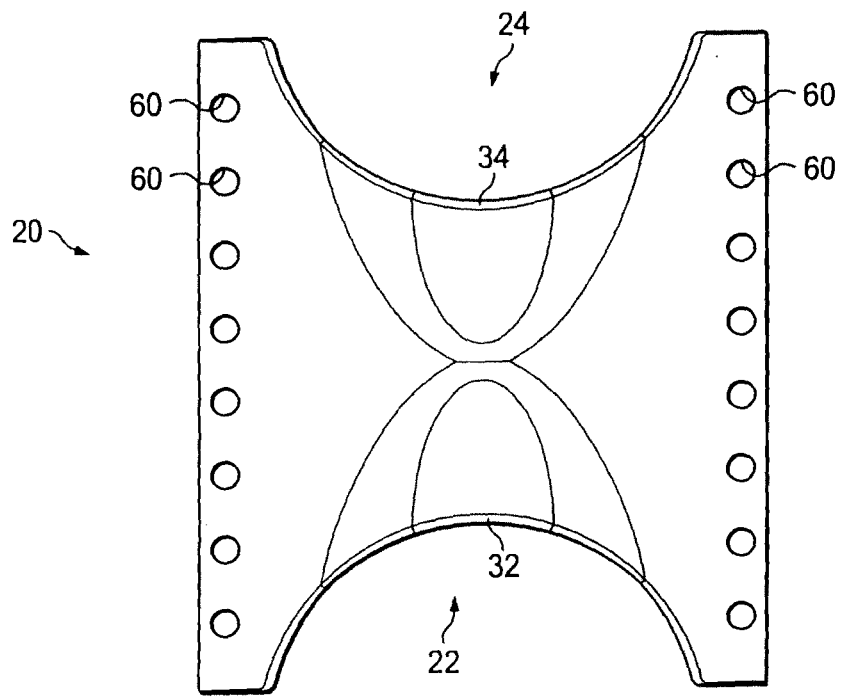
FIG. 4 is a schematic view of an outside surface of the inside pipe clamp segment of FIG. 1.
Figure 5:
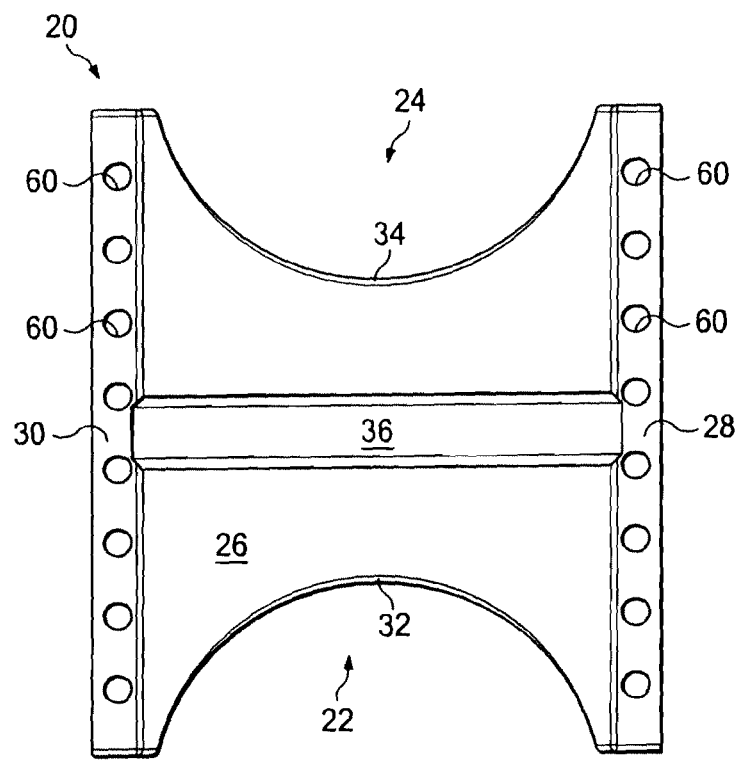
FIG. 5 is a schematic view of an inside surface of the inside pipe clamp segment of FIG. 1.
Figure 6:
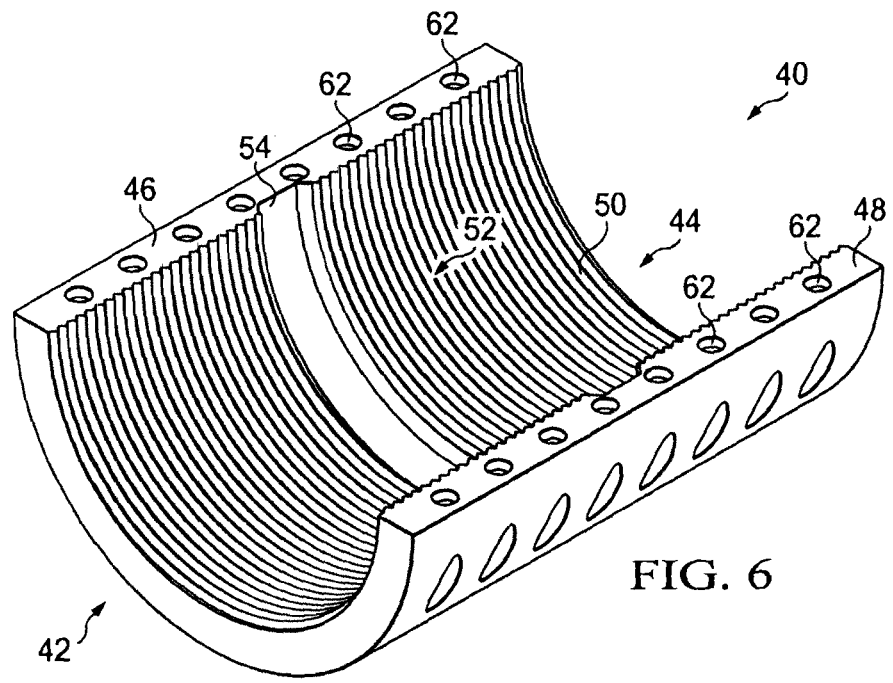
FIG. 6 is a perspective view of the outside pipe clamp segment of FIG. 1.
Figure 7:
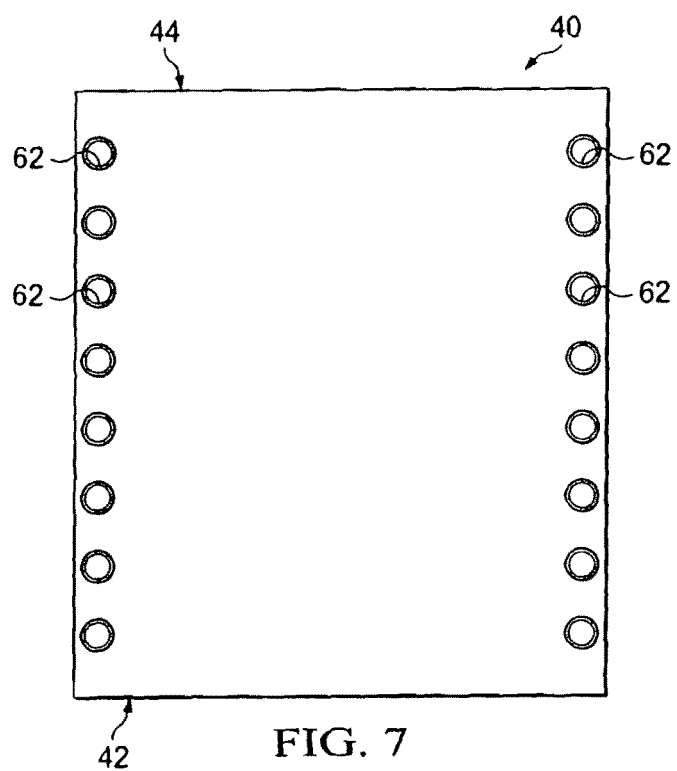
FIG. 7 is a schematic view of an outside surface of the inside pipe clamp segment of FIG. 1.
Figure 8:
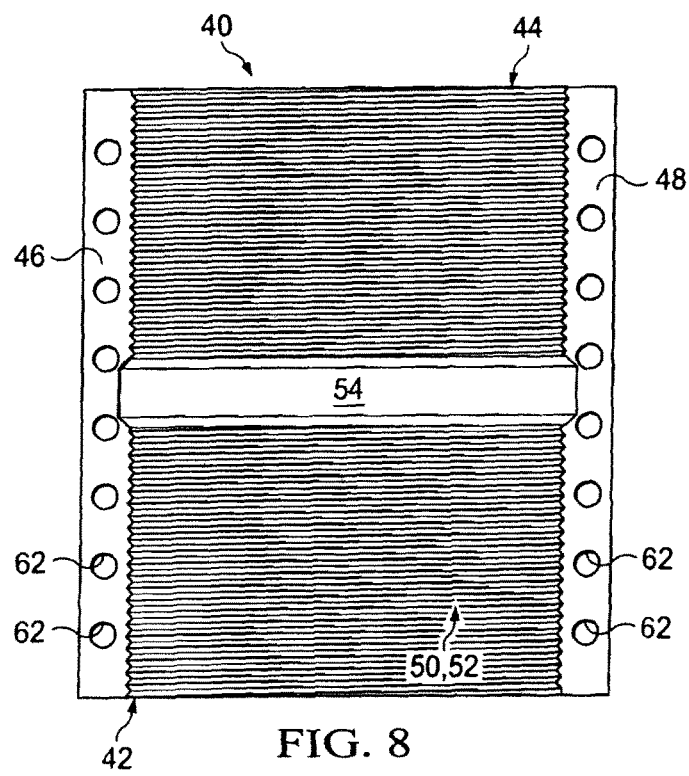
FIG. 8 is a schematic view of an inside surface of the inside pipe clamp segment of FIG. 1.

Pipe clamp 10 consists of inside clamp segment 20 (FIGS. 1, 3-5). Inside clamp segment 20 has a semi-cylindrical shape and has a first end 22 and a second end 24. Inside clamp segment 20 additionally has an inside surface 26, an upper lengthwise mating surface 28, and a lower lengthwise mating surface 30. First end 22 defines a first arch shaped area having an apex or first stress relief area 32. Second end 24 defines a second arch shaped area having an apex or second stress relief area 34 (FIGS. 3-5).

Inside clamp segment 20 preferably defines radial groove 36 for receiving butt weld 18 when inside clamp segment 20 is positioned on pipe 12. Inside surface 26 of inside clamp segment 20 is preferably substantially smooth for permitting slippage of an outside surface of pipe 12 with respect to inside surface 26 of inside clamp segment 20.

In one embodiment, first stress relief area 32 defines a first semi-circle and second stress relief area 34 defines a second semi-circle. The first semi-circle defined by first stress relief area 32 and a second semi-circle defined by the second stress relief area 34 preferably each have a radius approximately equal to the radius of pipe 12. Approximations of semi-circular shapes are also contemplated for use as stress relief areas.

In one embodiment, as best seen in FIG. 4, a thickness of inside clamp segment 20 proximate first end 22 and second end 24 is less than a thickness of inside clamp segment 20 at a center of inside clamp segment 20.

Pipe clamp 10 additionally consists of outside clamp segment 40 (FIGS. 1, 2, 6-8), having a semi-cylindrical shape. Outside clamp segment 40 has a first end 42 and a second end 44. Outside clamp segment 40 additionally defines an upper lengthwise mating surface 46 and a lower lengthwise mating surface 48. Outside clamp segment 40 additionally has an inside surface 50. Preferably, inside surface 50 defines a friction element 52. Friction element 52 is for gripping an outside surface of pipe 12.

Outside clamp segment 40 additionally preferably defines radial groove 54 (FIGS. 6, 8) for receiving butt weld 18 when outside clamp segment 40 is located on pipe 12. In a preferred embodiment, friction element 52 is made up of scoring on inside surface 50. More preferably, scoring is made up of threading. An example threading has a depth of 0.77" and a peak to peak measurement of 0.166". Friction element 52 may also be created through use of metal adhesives, low temperature metal alloy solders, or by a layer of hard particles located on inside surface 50.

Preferably, first lengthwise surface 28 and second lengthwise surface 30 of inside clamp segment 20 define a plurality of orifices 60. Additionally, in a preferred embodiment, first lengthwise surface 46 and second lengthwise surface 48 of outside clamp segment 40 defines a plurality of orifices 62. Plurality of bolts 64 (FIGS. 1, 2) are provided for locating in plurality of orifices 60 defined by first lengthwise surface 28 and second lengthwise surface 30 of inside clamp segment 20. Bolts 64 additionally locate within plurality of orifices 62 defined by first lengthwise surface 46 and second lengthwise surface 48 of outside clamp segment 40. Bolts 64 secure inside clamp segment 20 to outside clamp segment 40. In a preferred embodiment, bolts 64 have a head 64a and a shank 64b of smaller diameter. Preferably, inside clamp segment 20 defines orifices 60 that are threaded for receiving threaded shank 64b of bolt 64. Outside clamp segment 40 preferably defines orifices 62 that are smooth walled and define bolt head engaging surface 62a. Therefore, when bolt 64 is located within holes 60, 62, bolt head engaging surface 62a is drawn towards threads formed in holes 60, thereby drawing first lengthwise surface 28 of inside clamp segment 20 towards first lengthwise surface 46 of outside clamp segment 40.

In a preferred embodiment, inside clamp segment 20 and outside clamp segment 40 have a thickness such that pipe clamp 10, i.e., inside clamp segment 20 and outside clamp segment 40, is not plastically deformed by bending forces induced by the coiling process when pipe 12 is bent after pipe clamp 10 is secured to pipe 12.

In a preferred embodiment, inside clamp segment 20 and outside clamp segment 40 have a radius of curvature substantially equal to a radius of curvature of pipe 12. Preferably, inside clamp segment 20 and outside clamp segment 40 are sized such that when inside clamp segment 20 and outside clamp segment 40 are fully tightened about pipe 12, first lengthwise surface 28 of inside clamp segment 20 and first lengthwise surface 46 of outside clamp segment 40 do not touch one another. Similarly, it is preferred that second lengthwise surface 30 of inside clamp segment 20 and second lengthwise surface 48 of outside clamp segment 40 do not touch one another so that the full compressive force of inside clamp segment 20 and outside clamp segment 40 is impressed upon pipe 10 when bolts 64 are tightened.

Other methods of compressing pipe 12 within pipe clamp 10 are also contemplated, including forcing inside clamp segment 20 and outside clamp segment 40 together with hydraulic pressure. Inside clamp segment 20 and outside clamp segment 40 may also be forced together with tightened wire. Further, inside clamp segment 20 and outside clamp segment 40 may be forced together by metallic cooling of inside clamp segment 20 and outside clamp segment 40.

Figure 9:
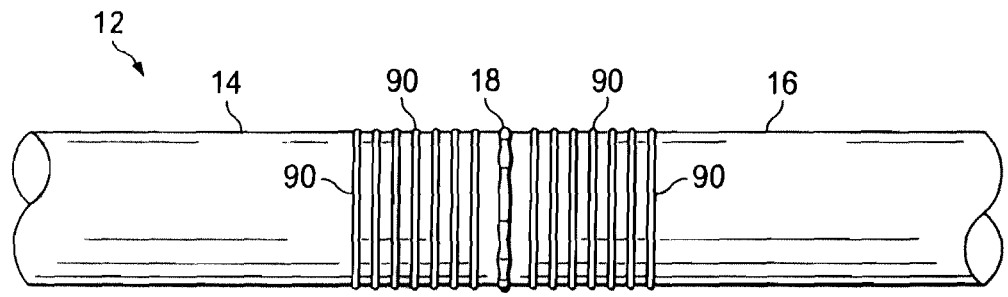
FIG. 9 is an elevation view of a modified pipe having scoring formed on ends adjacent to a circular weld.

Referring now to FIG. 9, an embodiment of the invention is shown wherein scoring 90 is formed on the outside of pipe 12 on both sides of butt weld 18 by an abrasive tool or other suitable method such as by roughening the outside of pipe 12 by sanding, etc. The process is the reverse of scoring clamp 10, as described above, but has a similar effect. Outside clamp segment 40 of clamp 10 could then have a smooth interior.

Figure 10:
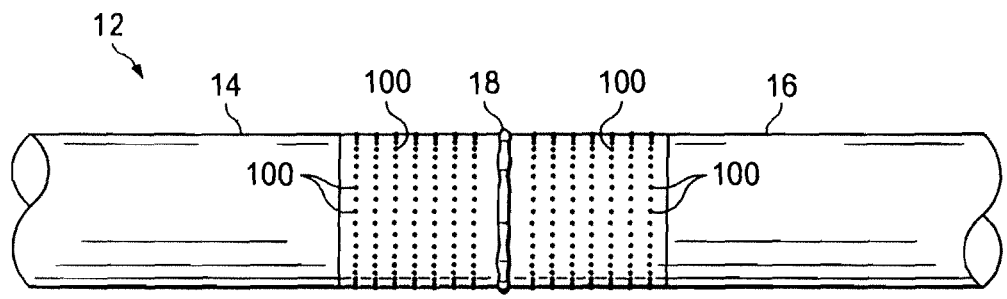
FIG. 10 is an elevation view of a modified pipe having small particles affixed to ends of pipe segments adjacent to a circular weld.

Referring to FIG. 10, sharp, small particles 100 of a very hard agent (harder than the steel, corundum, Aluminum oxide, Carborundum) are inserted (e.g., painted on in a viscous liquid or sprinkled onto a still liquid viscous adhesive on an outside half of pipe 12 or on inside surface 26 of outside clamp segment 40) between a smooth inside surface 26 of outside clamp segment 40 and an outside half of pipe 12. Clamp 10 is then tightened so that particles 100 will penetrate the surfaces of outside clamp segment 40 and pipe 12, creating a desired friction force.

Figure 11A:
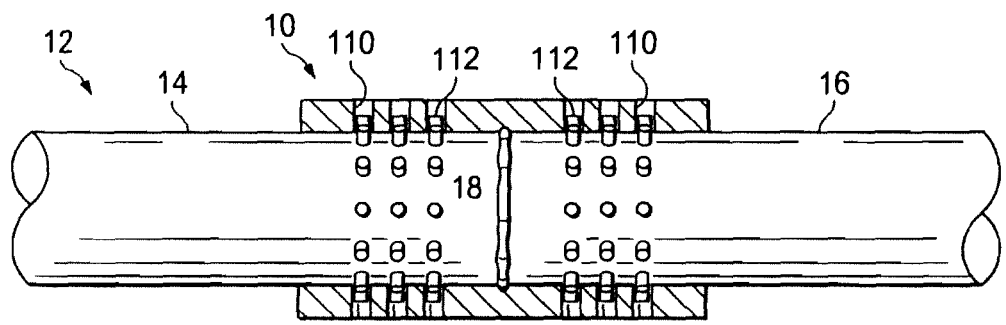
FIG. 11A is an elevation view of a modified pipe clamp secured to pipe segments, wherein the modified pipe clamp has Nelson studs affixed within drilled holes on an interior surface of the clamp.
Figure 11B:
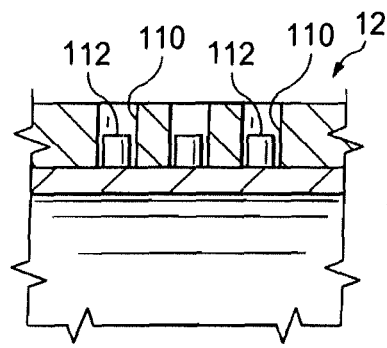
FIG. 11B is an enlarged view of the clamp of FIG. 11A showing a Nelson stud within a hole in a clamp member.

Referring to FIGS. 11A and 11B, an additional alternative pipe bend restraining device is shown. Many small holes 110, e.g., 15 mm in diameter, are drilled in the upper clamp. Nelson studs 112, e.g., 10 mm diameter×10 mm high, are affixed, e.g., spot welded, onto pipe 12. After bending of pipe 12 is complete, clamp 10 is removed and studs 112 may be ground down.

Figure 12A:
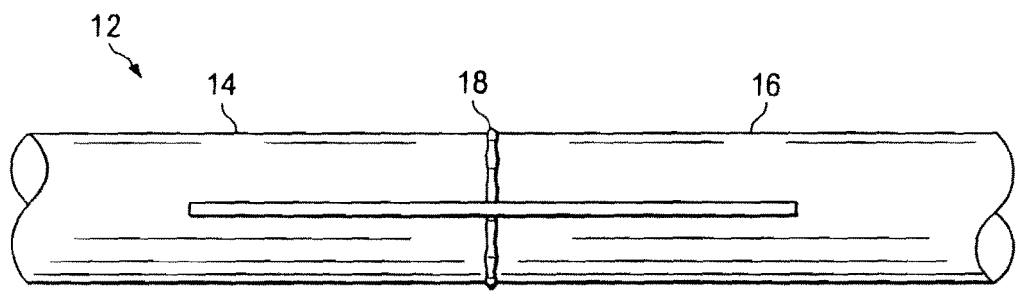
FIG. 12A is an elevation view of a modified pipe having a reinforcing strap or fin affixed to an exterior thereof, adjacent to a circular weld.
Figure 12B:
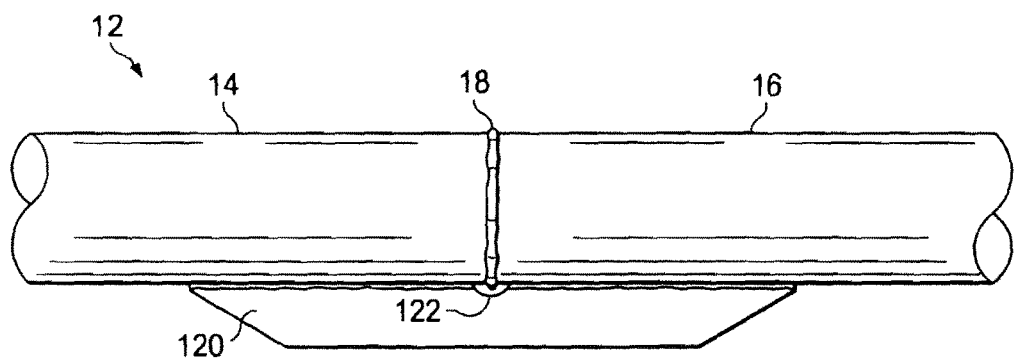
FIG. 12B is a plan view of the modified pipe of FIG. 12A.

Referring to FIGS. 12A and 12B, an alternative pipe bend restraining device is shown. At least one strap or fin 120 is welded on the outside of pipe 12, on the outside of the bend.

No clamp is required. Fin 120 may be, for example, 20" long, 4 inches high and 0.4" thick. Fin 120 preferably has a small circle cut out 122 (FIG. 9B) in the middle to accommodate the weld bead of butt weld 18. Fin 120 will prevent the outside of pipe 12 from being strained while pipe 12 is being bent. Once pipe 12 is on the Coselle®, fin 120 should be cut off and the surface ground smooth.

It is further contemplated that a pipe segment may be centered over butt weld 18. It is additionally contemplated that a pipe segment may be centered under butt weld 18 inside of pipe 12.

When the bending of pipe 12 is complete, clamp 10 is removed as follows: the inward force of pipe 12 is reduced by a very slight reverse turn of the spooling hub 66 (FIG. 13). Clamp 10 is then disassembled. Outside clamp segment 40 is removed and then inside clamp segment 20 of the clamp 10 is rotated around pipe 12 and lifted off. To facilitate the rotation, the bottom half of the clamp 10 preferably has a reasonably uniform or reduced thickness profile in the rotary sense.

In use, clamp segments 20, 40 are very strongly tightened up on pipe 12 by a series of bolts 64. Other clamp mechanisms may also be used. Friction element 52, e.g., scoring, small particles or studs, and the tightening threads in the bolt holes 60 wear down with use so that clamp 10 will have to be replaced after a number of uses.

Both segments 20, 40 of clamp 10 have a small channel or radial groove 36 of metal removed from the inside surface 26 of clamp segment 20 and inside surface 50 of clamp segment 40 in the hoop direction to accommodate the weld bead of weld 18. This obviates the need to grind the weld bead of weld 18.

The clamp 10 is preferably made of steel with a Young's Modulus closely equal to that of the steel of pipe 12. The yield stress of the steel used in the clamp 10 should be at least that of pipe 12 and up to 40% greater.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the specification.

What is claimed is:

1. A pipe clamp for affixing to a pipe subjected to bending, said pipe clamp comprising:
    an inside clamp segment having a semi-cylindrical shape, a first outermost longitudinal end and a second outermost longitudinal end;
    said first outermost longitudinal end defining a first stress relief area wherein a circumferential width of said first stress relief area diminishes as a function of distance from said first outermost longitudinal end of said inside clamp segment forming a first approximately semi-circular arch having an apex that extends longitudinally away from the first outermost longitudinal end and wherein said first stress relief area has a radius approximately equal to an inside radius of said inside clamp segment; and
    said second outermost longitudinal end defining a second stress relief area wherein a circumferential width of said second stress relief area diminishes as a function of distance from said second outermost longitudinal end of said inside clamp segment forming a second approximately semi-circular arch having an apex that extends longitudinally away from the second outermost longitudinal end and wherein said second stress relief area has a radius approximately equal to an inside radius of said inside clamp segment;
    an outside clamp segment having a semi-cylindrical shape and an inside surface;
    a clamp mechanism for securing said inside clamp segment to said outside clamp segment.

2. A pipe clamp according to claim 1 wherein:
at least one of said inside clamp segment and said outside clamp segment defines a radial groove for receiving a weld bead of a butt weld when said inside clamp segment and said outside clamp segment are located on the pipe.

3. The pipe clamp according to claim 1 wherein:
an inside surface of said inside clamp segment is substantially smooth and non-ribbed for permitting slippage of an outside surface of the pipe with respect to said inside surface of said inside clamp segment.

4. The pipe clamp according to claim 1 wherein:
said inside clamp segment has a thickness, an outside surface and an inside surface; and
said thickness proximate said first end of said inside clamp segment and proximate said second end of said inside clamp segment is less than the thickness of said inside clamp segment at a center of said inside clamp segment; and
wherein said thickness of said inside clamp segment tapers over a length of the inside clamp segment from said center to said first end and to said second end and wherein said taper is defined by said outside surface and not said inside surface for facilitating close contact of said inside surface with a pipe.

5. The pipe clamp according to claim 1 wherein:
said inside surface of said outside clamp segment defines one of a friction element and a friction element engaging surface, said friction element for gripping an outside surface of the pipe upon which said outside clamp segment is located; and
an inside surface of said inside clamp segment is substantially smooth and non-ribbed for permitting slippage of an outside surface of the pipe with respect to said inside surface of said inside clamp segment.

6. The pipe clamp according to claim 5 wherein:
said friction element is ridges on an inside surface of said outside clamp segment.

7. The pipe clamp according to claim 6 wherein:
wherein said ridges is comprised of threading.

8. The pipe clamp according to claim 1 wherein:
said inside clamp segment defines a first lengthwise surface and a second lengthwise surface;
said outside clamp segment defines a first lengthwise surface and a second lengthwise surface;
said first lengthwise surface and said second lengthwise surface of said inside clamp segment defines a plurality of orifices;
said first lengthwise surface and said second lengthwise surface of said outside clamp segment defines a plurality of orifices; and
said clamp mechanism is comprised of a plurality of bolts for locating in said plurality of orifices of said first lengthwise surface and said second lengthwise surface of said inside clamp segment and for locating in said plurality of orifices of said first lengthwise surface and said second lengthwise surface of said outside clamp segment for securing said inside clamp segment to said outside clamp segment;
a pipe; and wherein a circumference defined by an inside surface of said inside clamp segment and an inside surface said outside clamp segment is less than a circumference defined by an outside surface of said pipe upon which said clamp segments are located, thereby ensuring a gap exists between said first lengthwise surfaces and said second lengthwise surfaces when said clamp segments are secured to said pipe.

9. The pipe claim according to claim 8 wherein:
said bolts have a large diameter portion and a threaded smaller diameter portion.

10. The pipe according to claim 8 wherein:
said first lengthwise surface and said second inside surface have a width equal to a thickness of said inside clamp segment and said outside clamp segment; and
said orifices communicate with said first inside surface and said second inside surface;
said orifices are formed in-line with walls of said outside clamp segment and said inside clamp segment.

11. A pipe clamp for engaging to a pipe subjected to bending, said pipe clamp comprising:
an inside clamp segment having a semi-cylindrical shape, a first outermost longitudinal end and a second outermost longitudinal end;
an inside surface of said inside clamp segment that is substantially smooth and non-ribbed for permitting slippage of an outside surface of the pipe with respect to said inside surface of said inside clamp segment;
an outside clamp segment having a semi-cylindrical shape, a first end and a second end;
said outside clamp segment defines one of a friction element and a friction element engaging surface for gripping said outside surface of the pipe to which said outside clamp segment is engaged;
a clamp mechanism for securing said inside clamp segment to said outside clamp segment;
said first outermost longitudinal end of said inside clamp segment defines a first stress relief area and said second outermost longitudinal end of said inside clamp segment defines a second stress relief area;
wherein a circumferential width of said first stress relief area diminishes as a function of distance from said first outermost longitudinal end of said inside clamp segment forming a first approximately semi-circular arch having an apex that extends longitudinally away from said first outermost longitudinal end and wherein said first stress relief area has a radius approximately equal to an inside radius of said inside clamp segment; and
wherein a circumferential width of said second stress relief area diminishes as a function of distance from said second outermost longitudinal end of said inside clamp segment forming a second approximately semi-circular arch having an apex that extends longitudinally away from said second outermost longitudinal end and wherein said second stress relief area has a radius approximately equal to an inside radius of said inside clamp segment.

12. The pipe claim according to claim 11 wherein:
said friction element is on said outside clamp segment.

13. The pipe clamp according to claim 11 wherein:
said friction engaging surface is on said outside clamp segment.

14. The pipe clamp according to claim 11 wherein:
at least one of said inside clamp segment and said outside clamp segment defines a radial groove for receiving a weld bead of a butt weld when said clamp segments are located on the pipe.

15. The pipe clamp according to claim 11 wherein:
said inside clamp segment has a thickness, an outside surface and an inside surface; and
said thickness proximate said first end of said inside clamp segment and proximate said second end of said inside clamp segment is less than the thickness of said inside clamp segment at a center of said inside clamp segment; and
wherein said thickness of said inside clamp segment tapers over a length of the inside clamp segment from said center to said first end and to said second end and wherein said taper is defined by said outside surface and not said inside surface for facilitating close contact of said inside surface with a pipe.

16. The pipe clamp according to claim 11 wherein:
said friction element is ridges on an inside surface of said outside clamp segment.

17. The pipe clamp according to claim 16 wherein:
wherein said ridges are comprised of threading.

18. The pipe clamp according to claim 11 wherein:
wherein said inside clamp segment defines a first lengthwise surface and a second lengthwise surface;
wherein said outside clamp segment defines a first lengthwise surface and a second lengthwise surface;
wherein said first lengthwise surface and said second lengthwise surface of said inside clamp segment defines a plurality of orifices;
wherein said first lengthwise surface and said second lengthwise surface of said outside clamp segment defines a plurality of orifices; and
said clamp mechanism is comprised of a plurality of bolts for locating in said plurality of orifices of said first lengthwise surface and said second lengthwise surface of said inside clamp segment and for locating in said plurality of orifices of said first lengthwise surface and said second lengthwise surface of said outside clamp segment for securing said inside clamp segment to said outside clamp segment;
a pipe;
a circumference defined by inside surfaces of said inside clamp segment and said outside clamp segment is less than a circumference defined by said outside surface of said pipe upon which said clamp segments are located, thereby ensuring a gap exists between said first lengthwise surfaces and said second lengthwise surfaces when said clamp segments are secured to said pipe.

* * * * *